United States Patent [19]

Gaffney et al.

[11] Patent Number: 5,091,163

[45] Date of Patent: Feb. 25, 1992

[54] PARTIALLY PROTONATED SODIUM-ZSM-5 METHOD OF MAKING

[75] Inventors: Anne M. Gaffney; John A. Sofranko, both of West Chester, Pa.

[73] Assignee: Arco Chemical Technology, Inc, Wilmington, Del.

[21] Appl. No.: 375,214

[22] Filed: Jul. 3, 1989

[51] Int. Cl.$^5$ ............................................. C01B 33/39
[52] U.S. Cl. ..................................... 423/328; 502/77
[58] Field of Search ............... 423/328 T, 328, 328 C; 502/85, 64, 77

[56] References Cited

U.S. PATENT DOCUMENTS

| | | | |
|---|---|---|---|
| 3,140,253 | 7/1964 | Plank et al. | 423/328 C |
| 4,100,215 | 7/1978 | Chen | 585/454 |
| 4,420,418 | 12/1983 | Chu | 502/77 |
| 4,550,091 | 10/1985 | Sikkenga | 502/85 |
| 4,654,316 | 3/1987 | Barri et al. | 502/85 |

*Primary Examiner*—Michael Lewis
*Assistant Examiner*—Stuart L. Hendrickson
*Attorney, Agent, or Firm*—William C. Long

[57] ABSTRACT

The invention relates to a novel zeolite having protonated sites external to the pores and exchangeable cation sites within the pores, and to the preparation thereof.

1 Claim, 2 Drawing Sheets

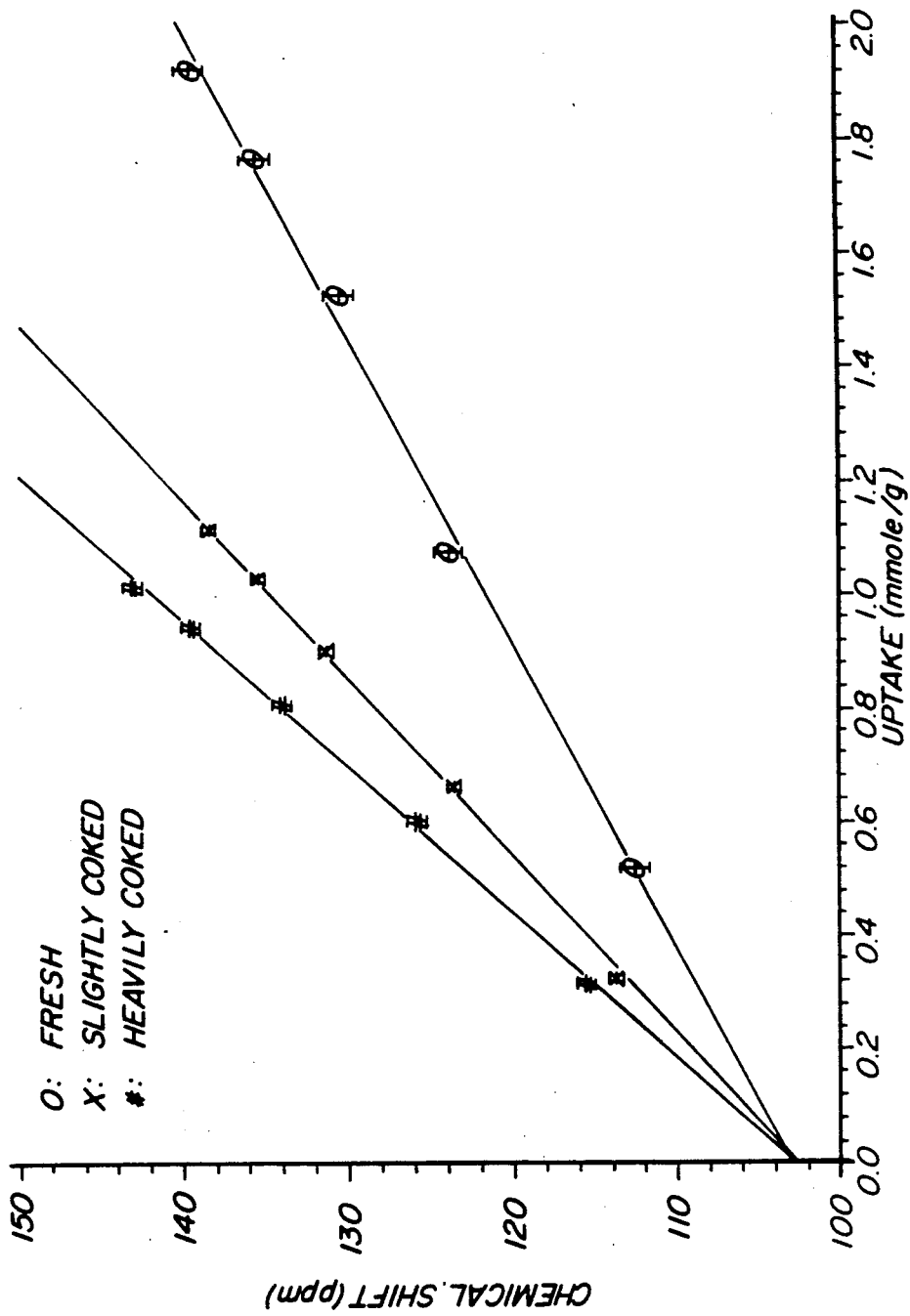

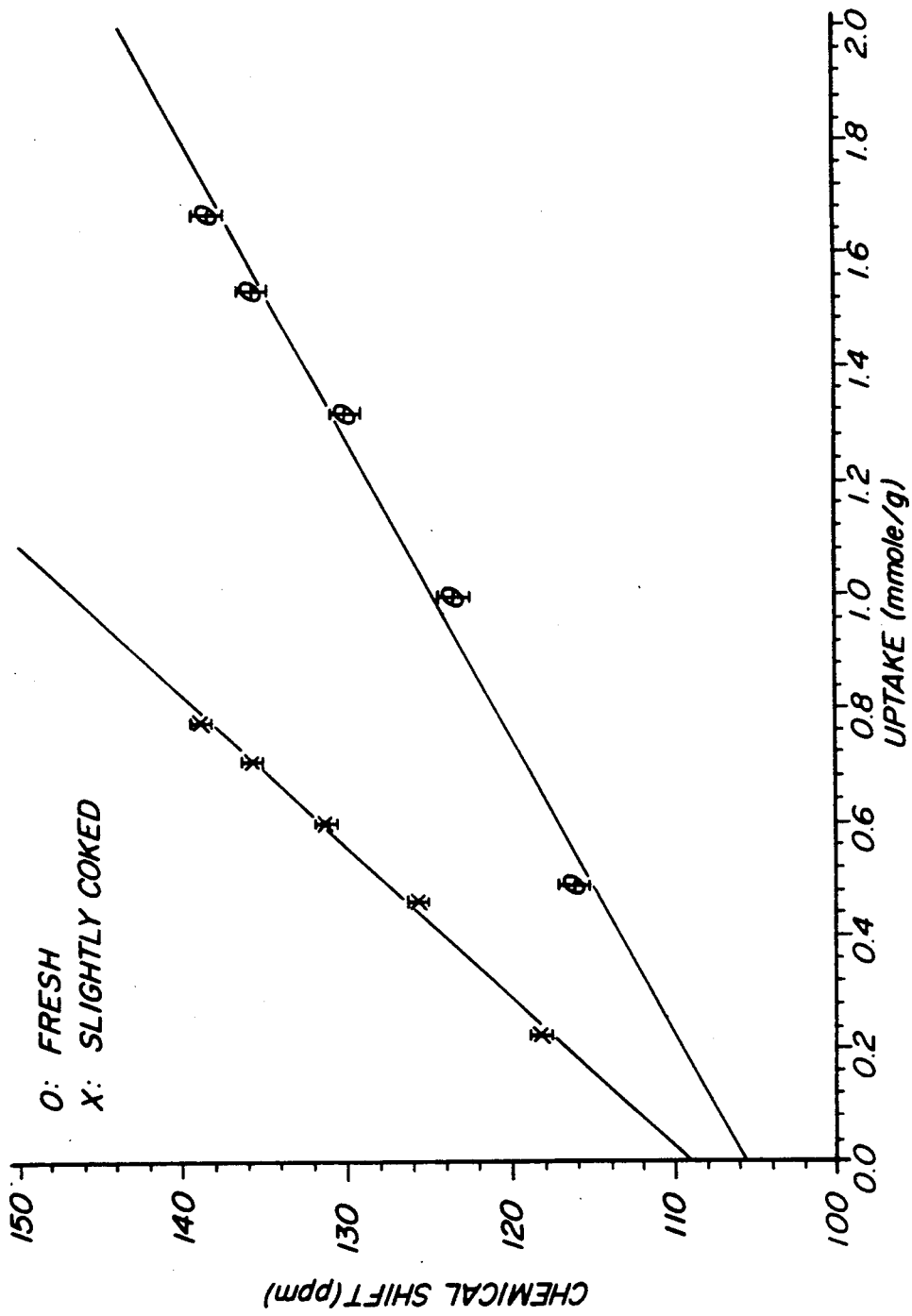

PARTIALLY PROTONATED SODIUM-ZSM-5 METHOD OF MAKING

BACKGROUND OF THE INVENTION

1. Field of the Invention

The present invention relates to a novel zeolite and to its preparation. In particular, the invention relates to a zeolite such as ZSM-5 which has cationic sites within the zeolitic pores and which has protonic sites external to the zeolitic pores. The novel zeolite is formed, for example, by contacting a Na-ZSM with a sterically hindered protonated salt which does not substantially enter the zeolitic pores whereby only cation on the surface external to the pores is exchanged for the proton.

2. Description of the Prior Art

There are a great number of patents which relate to crystalline zeolites, their production and use.

Reference can be made, for example, to the following U.S. Pat. Nos. which describe various zeolites: U.S. Pat. No. 3,702,886 which describes ZSM-5; U.S. Pat. No. 3,709,979 which describes ZSM-11; U.S. Pat. No. 3,832,449 which describes ZSM-12; U.S. Pat. No. 4,076,842 which describes ZSM-23; U.S. Pat. No. 4,016,245 which describes ZSM-35; and U.S. Pat. No. 4,046,859 which describes ZSM-38.

Generally speaking, the zeolites are prepared by crystallization and contain exchangeable cations, most notably sodium, distributed throughout. Since zeolite catalytic activity is due largely to acidic sites throughout the crystal, customarily the exchangeable cations throughout the structure are replaced by protons. The method most commonly employed for this exchange is contact with ammonium chloride which is effective in exchanging protons for cations located both on zeolite surfaces which are external to the pores as well as within the pores of the crystalline zeolite.

There are, however, processes where acid sites and consequent catalytic activity within the zeolite pores is not advantageous. An example of such a process is the conversion of higher saturated and olefinic hydrocarbons to low molecular weight olefins as set forth in copending application Ser. No. 07/343,097 filed April 25, 1989, now abandoned. Reactions occurring at acid sites within the pores promote the formation of carbon within these pores thus shortening the effective life of the zeolite.

For certain applications, a crystalline zeolite which has essentially only acid sites external to the pores offers distinct advantages. The present invention provides such a zeolite and its preparation.

BRIEF DESCRIPTION OF THE INVENTION

In accordance with this invention, a zeolite, which has been prepared by conventional methods such as shown in the U.S. Pat. Nos. cited above and which has exchangeable cation such as sodium located at sites both within and external to the zeolite pores, is contacted with a sterically hindered protonated salt whereby the cations external to the pores are exchanged for protons while those cations located within the pores remain.

DESCRIPTION OF THE DRAWINGS

The attached drawings show graphically the results of Xenon NMR tests on a standard H-ZSM-5 (FIG. 1) and on a comparable catalyst of the invention (FIG. 2).

DETAILED DESCRIPTION

In accordance with the invention, a crystalline zeolite having exchangeable cation such as Na+ at sites within the pore structure as well as external to the pores is formed by known procedures. The zeolite is contacted with a protonated sterically hindered salt in order to protonate essentially only the sites which are external of the zeolite pores.

Suitable sterically hindered salts are those wherein the static adsorption of the unprotonated species on the zeolite is less than 0.010 $\mu m^3/g$. See R. Szostak, "Molecular Sieves, Principles of Synthesis and Indentification", Burtron Davis, ed., Van Nostrand Reinhold Catalysis Series (1989), 306-312, and E. L. Wer, G. R. Landolt, A. W. Chester, "New Developments in Zeolite Science and Technology", Murakami, Iijima, Wards, eds, Elsevier, Amsterdam (1986); 547.

Especially preferred salts are those having the formula

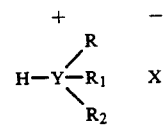

wherein Y is a Group 5a element, preferably N, P, As, Sb, Bi, and the like, X is halide, preferably Cl, and R, $R_1$ and $R_2$ are alkyl groups, preferably having 3 or more carbon atoms or aryl groups.

Novel zeolites of different pore opening sizes can be prepared according to the invention. It is essential only that the sterically hindered protonated salt which is used to protonate sites external to the pores has a static adsorption of the unprotonated species less than 0.010 $\mu m^3/g$.

In the case of treatment of Na-ZSM-5, (n-butyl)$_3$ N.HCl is a satisfactory salt. Other salts include (n-pentyl)$_3$ N.HCl, (i-butyl)$_3$ N.HCl, (n-butyl)$_2$ (ethyl) N.HCl and the like.

With larger pore zeolites, larger effective size protonated salts are used. With Na-ZSM-12, for example, illustrative protonated salts are (neopentyl)$_3$ N.HCl, (cyclohexyl)3 N.HCl, and the like.

The suitability of a particular salt for treatment of a particular zeolite is readily determined by measuring the static adsorption of the unprotonated species by standard test methods.

As a result of contact with these protonated salts exchangeable cations in the zeolite external to the pores are exchanged and replaced with protons and there is produced the novel zeolite of this invention.

Because only cations external to the zeolite pores are exchanged, the zeolite pores exhibit little or no catalytic activity since such activity is a direct function of acidity. Thus, the novel zeolite is a material wherein the catalytic activity is provided by the surfaces external to the pores and has wide utility in systems where diffusion into and reaction within the pores is not essential or desirable.

The zeolites of the invention are quite different when compared with materials made by conventional procedures. Comparing zeolites of the invention with materials prepared in the same fashion except that conventional protonation with, for example, ammonium chloride is employed demonstrates the significant differences. Cation levels, eg., Na+, are much higher in the zeolites of the invention. The constraint index likewise is remarkably different, being much lower than similar materials which have been substantially completely protonated. This illustrates the essential inactivity of surfaces within the zeolite pores by reason of the fact that sites therein are non-acidic.

In the preparation of the zeolites of the invention, the conventional preparation procedures described for example in U.S. Pat. Nos. 3,702,886, 3,709,979, 3,832,449, 4,076,842, 4,016,245, 4,046,859 and the like, and which result in the formation of a crystalline zeolite with exchangeable cation such as Na+ on surfaces within and external to the zeolite pores, can be employed. The disclosures of said Patents are incorporated herein by reference.

Treatment with the sterically hindered protonated salt is preferably carried out in a manner similar to that which has been employed previously to accomplish complete protonation of the zeolite. An aqueous solution of the sterically hindered protonated salt is contacted, preferably at mildly elevated temperature, eg. 50°–150° C., with the cation containing zeolite for a substantial time, eg. 10 minutes to 5 hours. Preferably, the contact is repeated with fresh sterically hindered salt solution several times to complete exchange of the cations for protons on surfaces external to the pores.

After treatment, the novel zeolite is preferably dried and calcined prior to use. The novel zeolites are particularly useful in processes such as those described in copending application 07/343,097 filed April 25, 1989, the disclosure of which is incorporated herein by reference.

EXAMPLE 1

A solution, Solution A, was prepared by mixing 200 grams $NaSiO_2$ with 150 ml of water. A second solution, Solution B, was prepared by mixing 75 grams NaCl, 6.70 grams $Al_2(SO_4)_3.16\ H_2O$, 19.60 grams $H_2SO_4$ and 340 ml $H_2O$. A third solution, Solution C, was prepared by mixing 25 grams tetrapropylammonium bromide with 100 ml $H_2O$.

Solution A and Solution B were combined and mixed for 5 minutes. Solution C was added to the mixture and the resulting mixture of Solution A, Solution B and Solution C was mixed for 50 minutes.

A 300 ml autoclave was charged with 175 ml of the mixture of the three solutions. The mixture was stirred in the autoclave and heated (149° C.) for 16 hours. After cooling, the product was removed from the autoclave and filtered to separate water. The zeolite crystals thus obtained were washed with water to remove residual chlorine. The resulting Na-ZSM-5 was dried at 110° C. and then calcined at 550° C. for 16 hours to remove the template.

To about 10 grams of the Na-ZSM-5 was added 500 ml of a 1 molar aqueous solution of $(n-butyl)_3N.HCl$ and the resulting heterogeneous mixture was heated to 80° C. and stirred for 2 hours. The solution was filtered and the ZSM-5 was contacted with a fresh 500 ml of solution, heated, stirred and filtered as above described. This procedure was repeated for a total of 5 times. The recovered solids comprising the novel zeolite of the invention were dried at 110° C. and calcined at 550° C. for 16 hours.

Elemental analysis of the novel zeolite showed that it contained 0.32 wt % sodium as compared to 4.3 wt % sodium for Na-ZSM-5 and <0.02 wt % sodium for H-ZSM-5. The Constraint Index for the novel zeolite as determined by the procedure given in U.S. Pat. No. 4,227,992 was 1.5; this can be compared with a Constraint Index for H-ZSM-5 which is normally about 10.8 at the same conditions.

The catalytic effect of the novel zeolite on the conversion of butene at 550° C., 25 WHSV and 16000 GHSV was determined and is compared with that of H-ZSM-5 in the following table:

TABLE 1

| Zeolite | % $C_4=$ Conversion | % Selectivity | | | | | |
|---|---|---|---|---|---|---|---|
| | | $C_3=$ | $C_2=$ | $C_{1-3}$ | $C_4$ | $C_{>5}$ | Coke |
| H-ZSM-5 | 60.2 | 48.9 | 6.2 | 1.6 | 6.5 | 36.8 | 0.04 |
| Novel ZSM-5 | 70.2 | 45.7 | 8.6 | 3.7 | 9.7 | 32.2 | 0.03 |

EXAMPLE 2

The novel ZSM-5 prepared as described in Example 1 was used in the conversion of n-octane to lower olefins. Specifically, a mixture of 3 wt. % of the zeolite, 60–100 mesh was admixed with T-64 $Al_2O_3$ of the same mesh size and the admixture was charged to a quartz reactor. N-octane, 300 WHSV $hr^{-1}$, was passed through the zeolite-alumina mixture at the indicated temperature for 2 hours followed by 2 hour air regeneration. Nitrogen purge was used between reaction and regeneration. The following table shows the results obtained:

TABLE 2

| | 550 | | 600 | | 650 | |
|---|---|---|---|---|---|---|
| Temp., °C. | ZSM-5 | Novel ZSM-5 | ZSM-5 | Novel ZSM-5 | ZSM-5 | Novel ZSM-5 |
| | % Conversion | | | | | |
| | 53.2 | 52.5 | 72.9 | 74.56 | 87.3 | 86.35 |
| | % Selectivity | | | | | |
| $CH_4$ | 0.80 | 0.65 | 1.57 | 1.08 | 0.37 | 2.62 |
| $C_2=$ | 7.67 | 7.88 | 11.07 | 11.64 | 17.85 | 15.57 |
| $C_2$ | 3.35 | 3.17 | 4.89 | 4.37 | 5.85 | 5.48 |
| $C_3=$ | 22.31 | 24.14 | 25.95 | 27.75 | 30.95 | 29.74 |
| $C_3$ | 8.80 | 10.88 | 9.44 | 9.46 | 5.83 | 6.47 |
| $i-C_4$ | 0.97 | 1.16 | 1.15 | 0.84 | 1.08 | 0.78 |
| BD | 0.03 | 0.03 | 0.08 | 0.07 | 0.25 | 0.23 |
| $n-C_4$ | 4.49 | 5.79 | 5.99 | 6.16 | 4.53 | 5.00 |
| $C_4=$ | 22.65 | 25.29 | 18.37 | 20.30 | 15.78 | 17.82 |
| $C_5=$ | 7.07 | 8.50 | 6.22 | 5.38 | 2.68 | 3.93 |
| $C_5$ | 6.45 | 6.89 | 7.84 | 5.51 | 2.77 | 3.90 |
| $C_6$ | 3.29 | 3.73 | 2.49 | 3.64 | 1.49 | 3.46 |
| $C_7$ | 5.53 | 0.74 | 1.21 | 0.46 | 2.92 | 0.76 |
| $C_8=$ | 4.21 | 0.06 | 2.18 | 2.23 | 6.13 | 2.64 |
| $C_9$ | 2.30 | 1.08 | 1.55 | 1.01 | 1.49 | 1.13 |
| $C_{10}$ | 0.01 | 0 | 0 | 0.06 | 0.01 | 0.03 |
| Coke | 0 | 0 | 0.1 | 0 | 0.05 | 0 |
| $C_3=/C_3$ | 2.5 | 2.2 | 2.7 | 2.9 | 5.3 | 4.6 |
| $C_3=/C_2=$ | 2.9 | 3.1 | 2.3 | 2.4 | 1.7 | 1.9 |

EXAMPLE 3

The novel zeolite prepared as described in Example 1 was used in short cycle conversion of butene-2. Temperature was 550° C., GHSV was 1600 $hr^{-1}$, WHSV was 25 $hr^{-1}$. Butene-2 was passed through the zeolite bed for 30 seconds, followed by 10 min. air regeneration. Nitrogen purge was used between reaction and regeneration. The following table shows the results obtained.

TABLE 3

| Novel ZSM-5 | ZSM-5 |
|---|---|
| % Conversion | |
| 64.7 | 68.9 |

TABLE 3-continued

| | Novel ZSM-5 | ZSM-5 |
|---|---|---|
| | % Selectivity | |
| $CH_4$ | 0.10 | 0.09 |
| $C_2$ | 0.08 | 0.11 |
| $C_2=$ | 8.0 | 7.9 |
| $C_3$ | 2.2 | 2.5 |
| $C_3=$ | 49.7 | 45.8 |
| $i-C_4$ | 2.7 | 3.0 |
| $n-C_4$ | 4.8 | 4.0 |
| BD | 0.2 | 0.20 |
| $C_5$ | 21.3 | 18.8 |
| $C_6$ | 10.6 | 17.1 |
| Coke | 0.5 | 0.6 |
| $C_3=/C_3$ | 22.6 | 18.3 |
| $C_2=/C_2$ | 100 | 71.8 |
| $C_3=/C_2=$ | 6.2 | 5.8 |

Both the novel zeolite described in Example 1 and a comparable H-ZSM-5 were analyzed by Xenon NMR. Results obtained are depicted graphically in FIG. 1 for the H-ZSM-5 and in FIG. 2 for the novel zeolite.

Xenon NMR analysis involves degassing a known quantity of zeolite sample to a pressure of $10^{-5}$ torr followed by Xenon uptake to 40-500 torr. The sample is analyzed on a Bruker WM 250 NMR spectrometer and the Xenon chemical shift as compared with a literature standard is determined as is the Xenon uptake at a series of pressures. This method of analysis is described in the literature. See, for example, J. Demarquay and J. Fraissard, Chem. Phys. Lett., 136 (1987) 314.

The results obtained and shown in the FIGURES clearly illustrate the important differences between the conventional zeolite and that of the invention.

For example, the Y-axis intercept of the conventional material is the same (approximately 103 ppm) for fresh as well as lightly and heavily coked material. This shows that the pore diameter had not changed and is indicative of coking within the zeolite channels at acid sites therein.

By way of contrast, the novel zeolite of the invention had a higher intercept (approximately 106 ppm) in the fresh condition and a significantly higher intercept when slightly coked. The higher intercept of the fresh catalyst compared to the conventionally fresh catalyst demonstrates narrowing of the pores of the novel catalyst due to the cation present at sites within the pores. The higher intercept of the lightly coked novel zeolite compared to fresh samples of the same catalyst is evidence that the coking takes place on surfaces external to the pores which results in partial blockage of the pore openings.

The data show the important differences between the zeolite of the invention wherein only surfaces external to the pores are protonated leaving cationic sites within the pores, and the conventional zeolite which has acidic protonated sites both within and external to the pores.

What is claimed is:

1. The method of preparing a crystalline ZSM-5 zeolite having protonated sites external to the pores and having exchangeable cation sites within the pores which comprises contacting a crystalline ZSM-5 zeolite having exchangeable $Na^+$ cation sites both within the pores and external to the pores with an aqueous solution of $(n-butyl)_3N.HCl$ at 50-150° C. for 10 minutes to 5 hours, and protonating essentially only exchangeable sites external to the pores while protonating substantially none of the exchangeable sites internal to the pores.

* * * * *